G. G. BRIGDEN.
SPRING TOOTH CULTIVATOR.
APPLICATION FILED JUNE 5, 1909.

944,770.

Patented Dec. 28, 1909.
2 SHEETS—SHEET 1.

WITNESSES

INVENTOR
George G. Brigden
BY
ATTORNEYS

G. G. BRIGDEN.
SPRING TOOTH CULTIVATOR.
APPLICATION FILED JUNE 5, 1909.
944,770.
Patented Dec. 28, 1909.
2 SHEETS—SHEET 2.
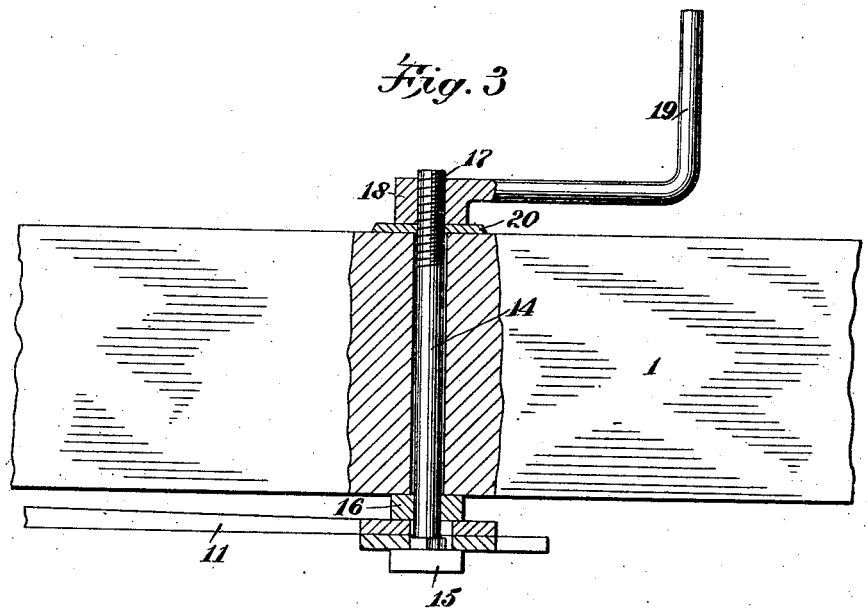
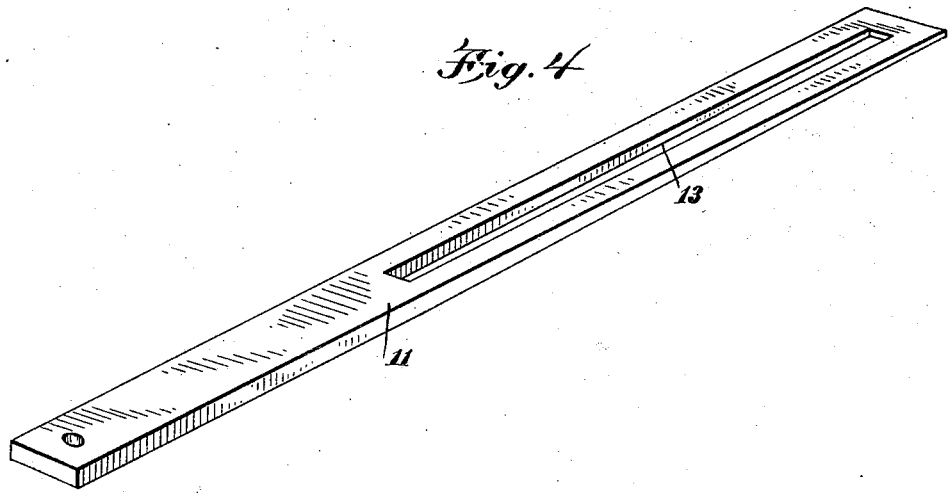
WITNESSES
INVENTOR
George G. Brigden
BY
ATTORNEYS

UNITED STATES PATENT OFFICE.

GEORGE G. BRIGDEN, OF CYPRESS, ALABAMA.

SPRING-TOOTH CULTIVATOR.

944,770.

Specification of Letters Patent.  Patented Dec. 28, 1909.

Application filed June 5, 1909. Serial No. 500,311.

*To all whom it may concern:*

Be it known that I, GEORGE G. BRIGDEN, a citizen of the United States, and a resident of Cypress, in the county of Hale and State of Alabama, have invented a new and Improved Spring-Tooth Cultivator, of which the following is a full, clear, and exact description.

This invention relates to cultivators, and particularly to that type of cultivator described in the patent to Arthur Brigden, No. 914,788. A cultivator of this type presents cross bars to which the spring teeth or hoes are attached. By adjusting the position of these cross bars, the arrangement of the teeth can be changed as desired.

The object of this invention is to provide an improved construction for the adjusting mechanism which will insure that the bars will hold themselves perfectly rigid in their different adjusted positions.

The invention consists in the construction and combination of parts to be more fully described hereinafter, and particularly set forth in the claims.

Reference is to be had to the accompanying drawings forming a part of this specification, in which similar characters of reference indicate corresponding parts in all the figures.

Figure 1:
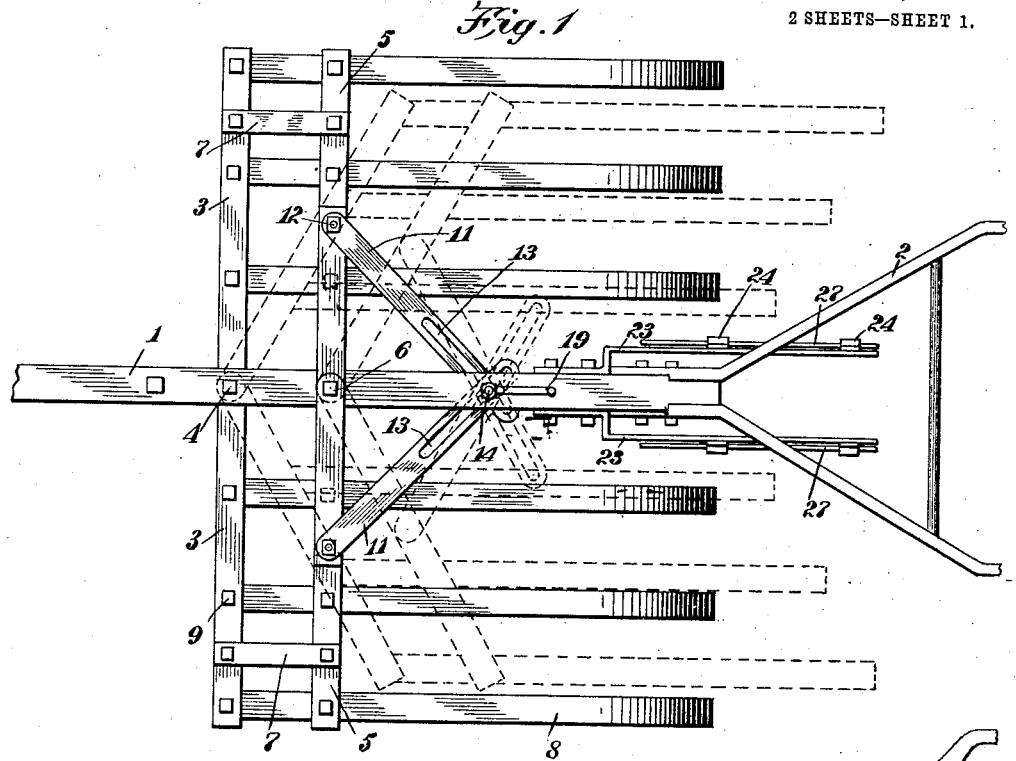
Figure 2:
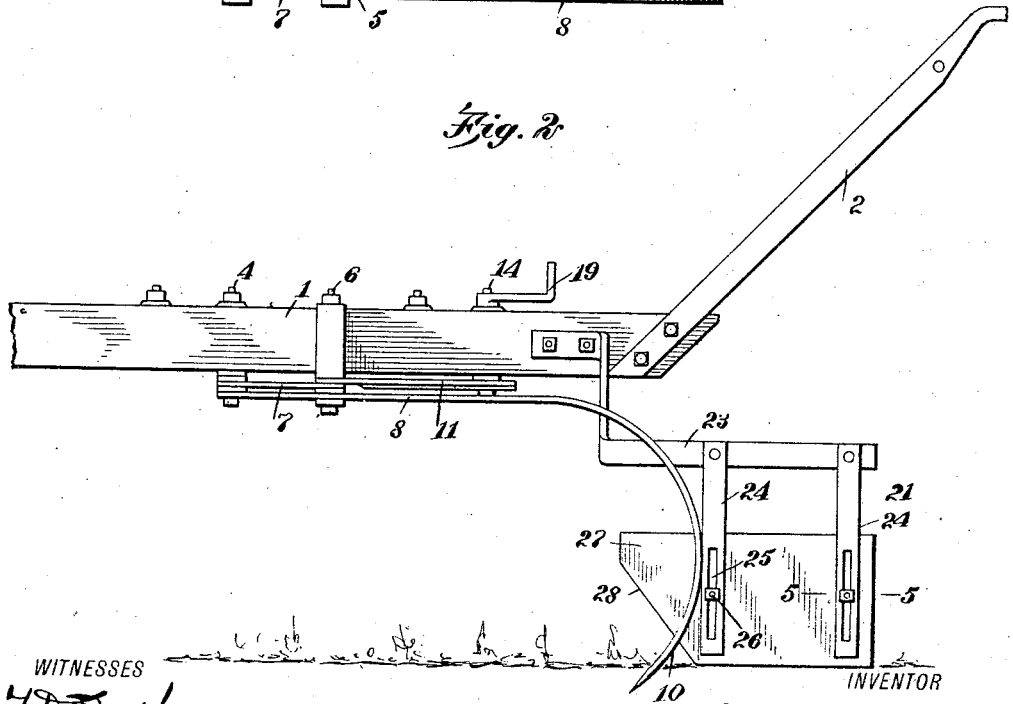

Figure 1 is a plan of a cultivator constructed according to this invention, the tongue and portions of the handle being broken away, in this view in dotted lines I represent the teeth in an adjusted condition; Fig. 2 is a side elevation of the cultivator shown in Fig. 1; Fig. 3 is a side elevation showing part of the tongue, the same being indicated partly in cross section, and illustrating particularly the means for clamping the adjusting links which hold the cross bars rigid; Fig. 4 is a perspective of one of the links referred to above.

Referring more particularly to the parts, and especially to Figs. 1 and 2, 1 represents the tongue or pole of the implement, to the rear end of which the handles 2 are attached, as shown. Near its rear end the pole is provided with laterally projecting cross bars 3 which are connected to the pole by a common pivot bolt 4. Behind these cross bars 3, rear cross bars 5, 5, are attached by a common pivot bolt 6, and these cross bars are parallel with the forward ones and connected therewith by links 7, as shown. To the cross bars 3 and 5, rearwardly extending teeth or hoes 8 are pivotally attached at 9. These teeth are disposed equidistant from each other and the rear ends thereof are formed into curved bows or springs 10, the ends of which are sharpened and till the earth, as will be readily understood.

At an intermediate point on each of the rear cross bars 5, an adjusting link 11 is attached by a pivot bolt 12. These links 11 extend toward the rear and converge so that they cross each other under the pole, as indicated in Fig. 1. Their rear extremities are provided with elongated slots 13, and through these slots a clamping bolt 14 passes, as shown. The details of this arrangement are illustrated in Fig. 3. The clamping bolt 14 has an enlarged head 15 which is adapted to clamp the overlapping links upwardly against a washer or seat 16 on the under side of the pole. The upper end of the bolt is provided with a thread 17 which receives the threaded hub 18 of a crank or adjusting lever 19. This hub seats on a washer 20 on the upper face of the pole.

As indicated in Figs. 3 and 4, the links 11 are tapered, that is, they are of gradually increasing thickness from their rear ends toward their forward ends. From this arrangement when they are clamped by means of the clamping bolt, the rearward pull which the ground exerts on the teeth would naturally tend to thrust the links rearwardly on account of the fact that they enlarge toward their forward ends, it therefore becomes impossible for the links to shift on the bolt under the working strain. On this account it will be evident that the links and the clamping bolt afford means for holding the cross bars in any adjusted positions such as that indicated in the dotted lines in Fig. 1.

Very near the rear end of the pole, a fender or guard 21 is attached. This fender comprises two frame bars 23 which are attached respectively on the sides of the pole, as shown. The bodies of these bars are depressed below the pole and extend rearwardly in a horizontal position, as indicated. From the frame bars 23, legs 24 extend downwardly, said legs consisting simply of iron straps, the lower ends of which are provided with slots 25, respectively, as shown. These slots 25 receive bolts 26 which are attached to vertically disposed guard plates 27 which are received against the inner side of the legs. These plates 27 are of substantially rectangular form, presenting inclined forward edges 28. When the cultivator is in use, this fender straddles the row of plants and protects them from the adjacent teeth of the harrow. It should be understood that the bolts 26 run loose in the slots so that the plates 27 may rise and fall as they pass over clods of dirt or unevennesses in the ground. In one aspect these plates 27 may be considered as floating plates or floating shoes which protect the plants and at the same time ride over clods of dirt and stones which may lie in their path.
Having thus described my invention, I claim as new and desire to secure by Letters Patent,—

1. A harrow having a plurality of teeth, members connecting said teeth so as to adjust the same, links for holding said teeth rigidly in their adjusted position, and means for clamping said links to hold said teeth rigidly, said links being tapered and enlarging in the direction from which the thrust is exerted at the clamping point.

2. A harrow having a pole, laterally disposed hoe bars attached thereto, teeth attached to said hoe bars, links attached to said hoe bars and crossing each other, and means for clamping said links together at said pole, said links being of a thickness gradually enlarging in the direction from which the pressure is exerted.

3. A cultivator having a pole, laterally extending hoe bars pivotally attached thereto, hoes attached to said hoe bars, links pivotally attached to said hoe bars and having elongated slots therein, and a clamping bolt mounted in said pole and passing through said slots, said links being of increasing thickness in the direction from which the thrust is exerted thereupon.

In testimony whereof I have signed my name to this specification in the presence of two subscribing witnesses.

GEORGE G. BRIGDEN.

Witnesses:
J. D. McCrory,
B. F. McCrory.